United States Patent
Severtson et al.

(10) Patent No.: US 6,248,793 B1
(45) Date of Patent: Jun. 19, 2001

(54) CONTAMINANT DISPERSANTS USEFUL IN RECYCLING OF TREATED CONTAINERS

(75) Inventors: Steven J. Severtson, Shoreview, MN (US); Martin J. Coffey, Wheaton, IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/258,627

(22) Filed: Feb. 26, 1999

Related U.S. Application Data

(63) Continuation-in-part of application No. 09/039,863, filed on Mar. 16, 1998, now Pat. No. 6,113,738.

(51) Int. Cl.[7] .............................. B01F 17/12; C09D 9/04; C11D 1/83
(52) U.S. Cl. .......................... 516/39; 162/4; 162/DIG. 4; 510/207; 510/424; 516/41; 516/42; 516/51
(58) Field of Search .................................. 516/39, 41, 42, 516/51; 510/207, 424; 162/DIG. 4

(56) References Cited

U.S. PATENT DOCUMENTS

| | | |
|---|---|---|
| 1,628,931 | 5/1927 | Todd . |
| 2,993,800 * | 7/1961 | Pickell .............................. 516/41 X |
| 3,262,838 | 7/1966 | Vieth et al. .............................. 162/8 |
| 3,287,149 | 11/1966 | Dooley et al. . |
| 3,537,990 | 11/1970 | Eck et al. . |
| 3,822,178 | 7/1974 | Koeppen et al. ........................ 162/5 |
| 3,940,334 | 2/1976 | Miyazawa . |
| 4,045,243 | 8/1977 | Wohlert .................................. 134/1 |
| 4,075,118 * | 2/1978 | Gault et al. ....................... 510/424 X |
| 4,117,199 | 9/1978 | Gotoh et al. ......................... 428/486 |
| 4,125,476 * | 11/1978 | Dean ................................ 510/207 X |
| 4,312,701 | 1/1982 | Campbell ................................. 162/4 |
| 4,483,741 | 11/1984 | Maloney et al. ......................... 162/5 |
| 4,518,459 | 5/1985 | Freis et al. ............................... 162/5 |
| 4,629,477 | 12/1986 | Geke ................................. 252/180 X |
| 4,643,800 | 2/1987 | Maloney et al. ......................... 162/5 |
| 4,810,421 * | 3/1989 | Marchesini ...................... 510/424 X |
| 4,923,566 | 5/1990 | Shawki et al. ........................ 162/135 |
| 5,209,823 | 5/1993 | Jansma et al. ........................ 162/146 |
| 5,324,437 | 6/1994 | Geke et al. ........................... 210/724 |
| 5,403,392 | 4/1995 | Craig .................................... 106/162 |
| 5,415,739 | 5/1995 | Furman, Jr. et al. ................. 162/158 |
| 5,491,190 | 2/1996 | Sandvick et al. ..................... 524/322 |
| 5,500,082 | 3/1996 | Chang et al. ............................ 162/5 |
| 5,539,035 | 7/1996 | Fuller et al. .......................... 524/322 |
| 5,541,246 | 7/1996 | Dandreaux et al. .................. 524/272 |
| 5,575,893 * | 11/1996 | Khan et al. ..................... 162/DIG. 4 |
| 5,654,039 | 8/1997 | Wenzel et al. ....................... 427/391 |
| 5,658,971 | 8/1997 | Allin et al. ............................. 524/28 |
| 5,716,925 * | 2/1998 | Mondin et al. .................. 510/424 X |
| 5,780,415 * | 7/1998 | Leonard et al. .................. 510/424 X |
| 5,939,376 * | 8/1999 | Durbut et al. ....................... 510/424 |
| 5,985,816 * | 11/1999 | Vlasblom ........................ 510/424 X |

FOREIGN PATENT DOCUMENTS

| | | |
|---|---|---|
| 0 568 229 A1 | 11/1993 | (EP) . |
| WO 91/05107 | 4/1991 | (WO) . |

OTHER PUBLICATIONS

Tappi Proceedings, 1986 Pulping Conference; Stickies Control of Detackification pp. 193–196.

* cited by examiner

*Primary Examiner*—Richard D. Lovering
(74) *Attorney, Agent, or Firm*—Margaret M. Brumm; Thomas M. Breininger

(57) ABSTRACT

Methods for controlling wax and other contaminants by improving the dispersion of these materials through the addition of contaminant dispersants to the process of recycling paper and paperboard are disclosed. A preferred contaminant dispersant comprises:
  a) water;
  b) a plasticizer;
  c) an anionic dispersant;
  d) a surfactant wetting agent; and
  e) either
    1) an acid or lecithin and optionally, a base, or
    2) a preneutralized component.

3 Claims, 3 Drawing Sheets

CONTAMINANT DISPERSANTS USEFUL IN RECYCLING OF TREATED CONTAINERS

CROSS-REFERENCE TO RELATED APPLICATION

This application is a continuation-in-part of U.S. patent application Ser. No. 09/039,863, filed Mar. 16, 1998 and now U.S. Pat. No. 6,113,738, entitled USE OF ADDITIVES TO BREAKDOWN AND STABILIZE WAX DURING FIBER RECYCLE.

FIELD OF THE INVENTION

The present invention relates to compositions and methods of use for the dispersion of contaminants during the recycling of coated papers. Wax is considered a contaminant, and the dispersability of wax is a critical component in the viability of recycling methods for wax coated fibers.

BACKGROUND OF THE INVENTION

Old corrugated containers (OCC) make up a high percentage of the recycled paper used in the United States, a majority of which is made into new container board. With such a high reuse level, old corrugated containers are an extremely important raw material for the container board industry. A potential significant source of OCC are wax treated containers. Wax treated containers are corrugated containers which are coated or impregnated with wax and used to ship fruit, produce and other agricultural products, as well as nonagricultural products such as bulk nail, screw, and bearing boxes. Wax treated containers represent an attractive fiber source due to their plenitude as well as the fact that one type of wax treated containers, namely, waxed corrugated, is typically produced from virgin fiber; making used waxed corrugated containers a high quality fiber source.

Currently, waxed corrugated is not accepted for recycling because it is considered too contaminated. If an attempt is made to recycle waxed corrugated, it fails because during the recycling process, released wax tends to collect on equipment and in the finished paper products causing problems with mill operations and affecting product quality. To reasonably increase the level of waxed OCC used by the paper industry to the point where mills will accept and possibly seek out waxed containers, significant improvements in new technology for controlling wax in the recycle plant will have to be made.

Approaches in the recycling industry for dealing with wax contamination have been threefold. The first solution is: repulping of the recycled wax treated containers with improved mechanical processes to aid separation. The second solution is using coating additives during application of the initial wax coating of the paper. The third solution is using repulping additives to improve the repulping process.

Mechanical improvements to the recycling process to increase efficiency (the first type of solution to the problem) include the use of ultrasound as described in U.S. Pat. No. 4,045,243 and a high pressure stream of steam in U.S. Pat. No. 4,312,701.

Development of more readily repulpable coatings (the second type of solution to the problem) that can be easily separated from fiber and removed with conventional cleaning systems (i.e., screens and cleaners) is ongoing. For example, dispersant coating additives are generally described in Patent Cooperation Treaty Patent Application WO 91/05107. Many polymeric additives to coatings have also been identified such as copolymers of acrylamide/acrylic esters; disclosed in U.S. Pat. No. 3,262,838. Additional polymeric additives to coatings include the copolymerization product of styrene and the half ester formed by the half esterification of one mole of an alpha-beta unsaturated dicarboxylic acid, disclosed in U.S. Pat. No. 3,287,149; butadiene-methyl methacrylate copolymer latex, disclosed in U.S. Pat. No. 4,117,199; a wax composition, disclosed in U.S. Pat. No. 5,539,035 and a variety of other polymeric coating additives, disclosed in U.S. Pat. Nos. 5,491,190; 5,658,971 and 5,654,039.

Another coatings additive useful in the creation of repulpable coatings are more readily repulpable hot melt adhesives, disclosed in U.S. Pat. No. 5,541,246.

Examples of the third type of solution (the development of repulping process additives) are a hydrophobically modified associative polymer including hydrophobically substituted polyethylene oxide polymers, disclosed in EP 0,568,229 A1; a substituted oxyethylene glycol non-ionic surfactant and a water-soluble low molecular weight polyelectrolyte dispersant, disclosed in U.S. Pat. No. 4,643,800; alkylamine polyethers for foam control, disclosed in U.S. Pat. No. 4,483,741 and use of trisodium phosphate, disclosed in U.S. Pat. No. 1,628,931. Moreover, additives to the repulping process for the removal of ink include long-chain alcohols, disclosed in U.S. Pat. No. 5,500,082 and surface-active poly(ethers), disclosed in U.S. Pat. No. 4,518,459.

What are needed are additional contaminant dispersant compositions capable of dispersing wax and other contaminants so that wax coated fiber can be effectively recycled.

SUMMARY OF THE INVENTION

The first aspect of the invention is a method of dispersing contaminants in a fiber slurry comprising the steps of:
  A.) optionally mixing the slurry;
  B.) adding to the slurry, while optionally mixing the slurry, a contaminant dispersant comprising
    1) a plasticizer, and optionally
    2) one or more ingredients selected from the group consisting of
      a) an anionic dispersant in combination with water containing either:
        i) acid or lecithin and optionally a base; or
        ii) a preneutralized component; and
      b) a surfactant wetting agent optionally in combination with water containing either:
        i) acid or lecithin and optionally a base; or
        ii) a preneutralized component;
      wherein if said plasticizer is the only ingredient present, said plasticizer is 2,2,4-trimethyl-1,3 pentanediol diisobutyrate; and
  C.) mixing said fiber slurry and allowing said contaminant dispersant to disperse contaminants present in said fiber slurry, causing formation of uncontaminated fibers.

The second aspect of the invention is a contaminant dispersant comprising:
  a) water;
  b) a plasticizer;
  c) an anionic dispersant;
  d) a surfactant wetting agent; and
  e) either
    1) a combination of an acid or lecithin and optionally a base, or
    2) a preneutralized component.

DETAILED DESCRIPTION OF THE INVENTION

Figure 1:
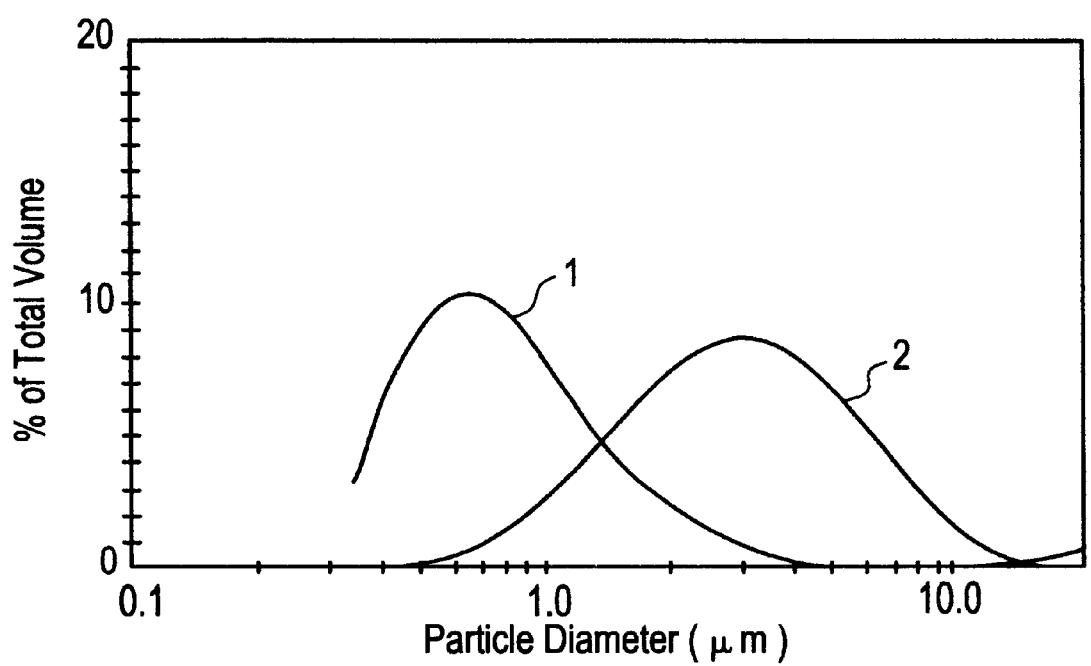
FIG. 1 is a Plot of Particle Size Distribution Measurements for Wax Dispersed with and Without the Instant Claimed Contaminant Dispersant. The Y-axis is the percent of the total volume represented by the particles with the size given on the X-axis.

As used herein, the term dispersant refers to an agent which produces energy barriers of sufficient height for dispersion of a particle. Dispersants may be ionic or nonionic. The term dispersion refers to a process which reduces the particle size of a contaminant and prevents that contaminant's agglomeration and deposition to the point where problems associated with machine runnability and product quality are significantly reduced.

The first aspect of the invention is a method of dispersing contaminants in a fiber slurry comprising the steps of:

A.) optionally mixing the slurry;
B.) adding to the slurry, while optionally mixing the slurry, a contaminant dispersant comprising
  1) a plasticizer, and optionally
  2) one or more ingredients selected from the group consisting of
    a) an anionic dispersant in combination with water containing either:
      i) acid or lecithin and optionally a base; or
      ii) a preneutralized component; and
    b) a surfactant wetting agent optionally in combination with water containing either:
      i) acid or lecithin and optionally a base; or
      ii) a preneutralized component;
    wherein if said plasticizer is the only ingredient present said plasticizer is 2,2,4-trimethyl-1,3 pentanediol diisobutyrate; and
C.) mixing said fiber slurry and allowing said contaminant dispersant to disperse contaminants present in said fiber slurry, causing formation of uncontaminated fibers.

The contaminants to be dispersed may be either synthetic or natural. Among natural contaminants are fatty acids, rosin acids, fatty esters and petroleum waxes. Among synthetic contaminants are stickies, ink and coating binders. Stickies include contact adhesives, hot melts and synthetic waxes. Even though the dispersants of the instant claimed invention have shown efficacy against a wide variety of contaminants, the primary target for their dispersing ability is wax, both synthetic and natural.

Wax is a generic term widely applied to a diverse group of natural and synthetic products which have similar physical characteristics; they are plastic solids at ambient temperatures, and low viscosity fluids at moderately elevated temperatures. The chemical composition of waxes can be complex, containing a variety of molecular weight species and functional groups, or relatively simple, as in the case of some petroleum and synthetic waxes which are composed solely of hydrocarbons. Natural waxes are derived from various sources such as insects, animals, vegetables, minerals, and petroleum. Examples of synthetic waxes include low molecular weight polyethylene (weight average molecular weight<600 Daltons) solid polyethylene glycols, amide waxes, and Fischer-Tropsch waxes (low molecular weight polymethylene).

Depending on the specific application, waxed corrugated containers will be coated with blends of paraffin and micro waxes as well as blends that include synthetic waxes, polymers, and resins. Synthetic waxes such as polyethylene and Fischer-Tropsch are similar to paraffin wax in that they are composed of unbranched alkanes, but because they're polymeric materials they tend to have much higher molecular weights. For example, polyethylene waxes are composed of low molecular weight polyethylenes, and Fischer-Tropsch are low molecular weight polymethylenes.

Fiber slurries wherein the method of the instant invention can be conducted are created through the process of recycling of wax treated containers. These recycle slurries typically comprise water, fibers from the original containers, and synthetic and/or natural contaminants described previously. In addition to recycle slurries there are fiber slurries referred to as repulping slurries which also comprise water, fibers from the original containers, and synthetic and/or natural contaminants described previously.

A plasticizer is anything which reduces the temperature at which a substance undergo transformation from a solid to a liquid form. The plasticizer may be selected from the group consisting of adipates including adipic acid, dimethyl adipate, diethyl adipate, di-n-butyl adipate, diisobutyl adipate, di-n-hexyl adipate, di (1,3-dimethylbutyl) adipate, di-2-ethylhexyl adipate, diisooctyl adipate, dicapryl adipate, heptyl nonyl adipate, diisononyl adipate, n-octyl-n-decyl adipate, diisodecyl adipate, dicyclohexyl adipate, benzyl octyl adipate, dibutoxyethyl adipate, bis(2,2,4-trimethyl-1, 3-pentanediol monoisobutyl) adipate bis(4-chlorobutyl) adipate and diisohexyl adipate; 2,2,4-trimethyl-1,3-pentanediol diisobutyrate, amide-esters, azelates, benzoates, benzotriazoles, esters and ethers, including, but not limited to brassylates, carbonates, citrates, epoxy compounds, glutarates, glycerol esters, glycol esters, glycols, glycolates, hexahydrophthalates, hydrocarbons, isobutyrates, isophthalates, isosebacates, ketones, nitro compounds, oleates, palmitates, pentaerythritol esters, phosphates, phosphites, phthalates, polyesters and polymeric plasticizers, pyromellitates, ricinoleates, salicylates, sebacates, stearates, succinates, sucrose derivatives, sulfonamides, sulfonates, sulfones, tartrates, terephthalates, tetrahydrophthalates, thianthrenes, trimellitates, and terpenes and mixtures and derivatives thereof.

When the contaminant dispersant is only plasticizer, the plasticizer is 2,2,4-trimethyl-1,3-pentanediol diisobutyrate. When the dispersant has other ingredients in addition to plasticizer in it, the plasticizer is preferably 2,2,4-trimethyl-1,3-pentanediol diisobutyrate. 2,2,4-trimethyl-1,3-pentanediol diisobutyrate is available from Eastman Chemical Company (100 North Eastman Road, Kingsport, Tenn., 37660, (423) 229-2000).

In addition to plasticizer, contaminant dispersants useful in the method of the instant claimed invention may also include one or more ingredients selected from the group consisting of:

a) an anionic dispersant in combination with water containing either:
  i) acid or lecithin and optionally a base; or
  ii) a preneutralized component; and
b) a surfactant wetting agent optionally in combination with water containing either:
  iii) acid or lecithin and optionally a base; or
  iv) a preneutralized component.

The anionic dispersant is selected from the group consisting of naphthalene sulfonate formaldehyde condensed polymers and ligno sulfonates. The preferred anionic dispersant is naphthalene sulfonate formaldehyde condensed polymers. The naphthalene sulfonate formaldehyde condensed polymer has a weight average molecular weight of from about 500 Daltons to about 120,000 Daltons. Due to the chemistry involved in the formaldehyde condensation process, the typical polymer preparation will consist of a number of molecular weight species and the weight average will reflect in which direction the distribution of species is skewed. In no case will there be a single molecular weight entity and it is recognized that the distribution and resulting average molecular weight will be important in determining the efficiency of the product. In terms of intrinsic viscosity, IV, the anionic polymer is generally within the range of 0.02 to 0.05, and in some instances may be as high as 0.30. The anionic groups are provided by naphthalene sulfonate moieties and control the anionic charge density of the polymer. This charge density can be modified by adding another condensable species, such as phenol, urea or melamine which will copolymerize with the naphthalene sulfonate and formaldehyde. In this way the charge per unit weight can be decreased by adding a neutral or cationic species to the cross-linked, anionic sulfonate. The charge on the anionic polymer is preferably 2.0 to 3.0 equivalents per kilogram but may be as low as 1.0 or as high as 4.0 equivalents per kilogram. Naphthalene sulfonate formaldehyde condensed polymers are available from Hampshire Chemical Corporation (45 Hayden, Suite 2500, Lexington, Mass., 02421-7994, (718) 861-6600).

The term "surfactant wetting agent" is meant to encompass agents which wet particle surfaces without raising energy barriers of sufficient height to disperse the particle. The surfactant wetting agent suitable for use in the contaminant dispersant of this invention is selected from the group consisting of block copolymer of ethylene oxide and propylene oxide, polyoxyethylenated alkylphenols, polyoxyethylenated straight-chain alcohols, polyoxyethylenated polyoxypropylene glycols, polyoxyethylenated mercaptans, long-chain carboxylic acid esters, alkanolamides, tertiary acetylenic glycols, and polyoxyethylenated silicones. The preferred surfactant wetting agent are block copolymers of ethylene oxide and propylene oxide (hereinafter "EO/PO copolymers").

EO/PO copolymers of interest may have a weight average molecular weight of from about 2000 Daltons to about 5000 Daltons and an EO content of from about 0 to about 30%. Preferred HLB (hydrophobic-lipophobic balance) values are from about 1 to about 8. Higher molecular weight structures with a low EO content are known as excellent wetting agents. Examples may include block terpolymers which include butylene oxide/ethylene oxide/propylene oxide. The preferred EO/PO copolymer for use in the contaminant dispersant of the instant claimed invention is a L101 EO/PO block copolymer, which is 10 mole % ethylene oxide, has a weight average molecular weight of about 3600 Daltons and has 100% actives. L101 EO/PO block copolymer is available from BASF Corporation, 3000 Continental Drive North, Mt. Olive, N.J. 07828-1234, (800) 526-1072.

The term "acid" refers to a moiety with a fatty component, said fatty component containing one or more $C_6$ or longer alkane groups, and an oxygen containing component. For use in the contaminant dispersant of the instant claimed invention the acid is selected from the group consisting of dodecyl benzenesulfonic acid, tridecyl benzenesulfonic acid and fatty acids, including, but not limited to, stearic acid. Preferably the acid is dodecyl benzenesulfonic acid.

The term "base" refers to a moiety capable of neutralizing the acid that it is being used in conjuction with. Once the acid has been selected, selection of the base is within the skills of a person of ordinary skill in the art. For use in the contaminant dispersant of the instant claimed invention the base is selected from the group consisting of triethanol amine, sodium hydroxide and potassium hydroxide. Preferably the base is triethanol amine.

When added to the water, the acid gives an extremely low pH. Similarly, the base will give a high pH in an aqueous solution. In a mixture the acid and base will react to form a coupling agent and the aqueous solution will have a pH of approximately 8.5. It has been found that the coupling agent component of the contaminant dispersant mixture helps reduce the particle size of wax which is very useful in successfully dispersing the wax.

It has also been found that in place of a combination of acid and base, in any of the previously described formulations, lecithin can be used. Lecithin is a general term for a class of phosphate esters. Lecithin is available from Central Soya Company, Inc. P. O. Box 2507, Fort Wayne, Ind. 46801-2507 (219) 425-5230.

In place of adding either acid or lecithin optionally in combination with base, a preneutralized ingredient may be added. The preneutralized ingredient may be selected from the group consisting of sulfonates of dodecyl and tridecylbenzene, and sulfonates of oils and fatty acids. The preferred preneutralized component is a sulfonate of dodecylbenzene or tridecylbenzene.

The ranges, in weight percent, of all the combination of ingredients that are possible in formulating the contaminant dispersant of the instant claimed invention are presented in Table A. In Table I, the broad ranges for each possible ingredient are given in weight percent for several formulas.

TABLE A

| Ingredients | 1 | 2 | 3 | 4 | 5 | 6 | 7 | 8 | 9 |
|---|---|---|---|---|---|---|---|---|---|
| Plasticizer | 100 | 5–99 | 5–40 | 5–40 | 5–40 | 5–40 | 5–40 | 5–40 | 14.3 |
| anionic dispersant | | | | 5–20 | 5–20 | | 5–20 | 5–20 | 14.3 |
| surfactant wetting agent | | 95–1 | 5–20 | | 5–20 | 5–20 | | 5–20 | 14.3 |
| acid or lecithin | | | | 5–20 | 5–20 | 5–20 | | | 7.1 |
| base | | | | 5–20 | 5–20 | | | | 7.1 |
| preneutralized component | | | | | | 5–20 | 5–20 | 5–20 | |
| water | | | 10–80 | 10–80 | 10–80 | 20–85 | 20–85 | 10–80 | 42.9 |

In Table B, the preferred broad ranges for each possible ingredient are given in weight percent for several formulas.

TABLE B

| Ingredients | 1 | 2 | 3 | 4 | 5 | 6 | 7 | 8 | 9 |
|---|---|---|---|---|---|---|---|---|---|
| Plasticizer | 100 | 60–80 | 10–30 | 10–20 | 10–20 | 10–30 | 10–20 | 10–20 | 14.3 |
| anionic dispersant | | | | 5–15 | 10–20 | | 5–15 | 10–20 | 14.3 |
| surfactant wetting agent | | 20–40 | 10–20 | 10–20 | 10–20 | | 10–20 | | 14.3 |
| acid or lecithin | | | 10–15 | 5–15 | 5–15 | | | | 7.1 |
| base | | | 10–15 | 5–15 | | | | | 7.1 |
| preneutralized component | | | | | | 10–15 | 5–15 | 5–15 | |
| water | | | 20–60 | 35–75 | 25–65 | 35–70 | 40–80 | 25–65 | 42.9 |

In Table C, the most preferred broad ranges for each possible ingredient are given in weight percent for several formulas.

TABLE C

| Ingredients | 1 | 2 | 3 | 4 | 5 | 6 | 7 | 8 | 9 |
|---|---|---|---|---|---|---|---|---|---|
| Plasticizer | 100 | 80 | 20 | 20 | 20 | 20 | 20 | 20 | 14.3 |
| anionic dispersant | | | | 10 | 10 | | 10 | 10 | 14.3 |
| surfactant wetting agent | | 20 | 10 | | 10 | 10 | | 10 | 14.3 |
| acid or lecithin | | | 10 | 10 | 10 | | | | 7.1 |
| base | | | 10 | 10 | | | | | 7.1 |
| preneutralized component | | | | | | 10 | 15 | 10 | |
| water | | | 50 | 50 | 50 | 60 | 45 | 50 | 42.9 |

The contaminant dispersant of formula 9 is the preferred formula for the contaminant dispersant, as follows:
water, about 42.9 weight %;
plasticizer, which is 2,2,4-trimethyl-1,3-pentanediol diisobutyrate, about 14.3 weight %;
surfactant wetting agent, which is L101 EO/PO block copolymer, 100% actives, about 14.3 weight %;
anionic dispersant, which is sodium salt of napthalene sulfonate, about 14.3 weight %;
acid, which is dodecyl benzenesulfonic acid, about 7.1 weight %; and
base, which is triethanol amine, about 7.1 weight %.

A contaminant dispersant with this formula is available from Nalco Chemical Company under the product identifier 97PO147.

The contaminant dispersants described herein are to be applied at dosages tailored to the specific fiber slurry to be treated. A significant factor in determining how much of the treatment to utilize is the amount of contaminants known to be present in the process stream to be treated. For every unit of contaminant the amount of contaminant dispersant ranges from about 0.1 unit to about 1 unit, and preferably the amount of contaminant dispersant relative to each unit of contaminant is about 0.25.

Mode of addition of the ingredients in the contaminant dispersant to the fiber slurry is not critical. The ingredients can be pre-blended for addition of one contaminant dispersant product at one time and in one point in the system, or addition at multiple points in the system. Moreover, each ingredient in the contaminant dispersant may be fed separately to the system.

The treatment of contaminants to decrease their interference in the recycling process may be accomplished in either of two ways by the treatments described herein. The contaminant may be sufficiently dispersed as to become completely dissociated from the fiber, or the contaminants may be retained with the fiber but in reduced size as a result of treatment.

Mixing of the fiber slurry is required in order for the contaminant dispersant to be effective. Shear force sufficient for mixing is provided by the pulp and paper process itself, for example, from the refiners, repulpers, agitators, and fan pumps. Therefore mixing may be either the result of a specific mechanical step during the process, or may stem from the flow conditions inherent in the process. The mixing must take place after the contaminant dispersant has been added to the fiber slurry. Optionally, the fiber slurry can also be mixed prior to adding the contaminant dispersant and during addition of the contaminant dispersant to the fiber slurry. It is preferred that the fiber slurry is mixed before, during and after the contaminant dispersant is added to the fiber slurry.

After the contaminant dispersant has been used to disperse contaminants the method of dispersing contaminants may be extended to D.) separating said uncontaminated fibers from said slurry.

In order to facilitate separating said uncontaminated fibers from said slurry a compound selected from the group consisting of coagulants, bentonite and colloidal silica may be added in order to more readily agglomerate contaminates. Agglomerated contaminants are easier to remove from the slurry and removal of agglomerated contaminants is one way of facilitating separating uncontaminated fibers from said slurry. Coagulants useful in the method of this invention include, but are not limited to, alum, polyaluminum chloride, or cationic polymers such as poly(amine/epichlorohydrin) condensation polymers, polyethylene imines, poly(aminoamide/epichlorohydrin) condensation polymers, poly(diallyldimethylammonium chloride), and glyoxalated acrylamide/diallyldimethyl ammonium chloride copolymers among others.

After the contaminant dispersant has been used to disperse contaminants and said uncontaminated fibers have been separated from said slurry, the method of dispersing contaminants may be extended to:

E.) recovering said uncontaminated fibers.

Recovering of uncontaminated fibers may be accomplished by using techniques known to people of ordinary skill in the art.

The following examples are presented to describe preferred embodiments and utilities of the invention and are not meant to limit the invention unless otherwise stated in the claims appended hereto.

EXAMPLES

Example 1

To determine the effectiveness of the contaminant dispersion, the following procedure was utilized. Three grams of bleached kraft dry lap fiber, 250 mL of hardened distilled water (275.4 ppm $CaCl_2.2H_2O$, 231 ppm $MgSO_4.7H_2O$, 231 ppm $NaHCO_3$) and the contaminant dispersion were combined in a jacketed mixer (Eberbach Corporation, P.O. Box 1024, 505 South Maple Street, Ann Arbor, Mich., 48106-1024, 800-422-2558) and allowed to equilibrate to a temperature of 125° F.(51.7° C.). A sample (100±1 mg) of crushed Amoco (2000 East Randolph Drive, Chicago, Ill. 60601-7125, (312) 856-6111) Eskar Wax R-35, petroleum wax with a melting point of approximately 131° F. (55° C.) was then added and the mixer was run on high for 6 minutes. The generated fiber-wax slurry was then filtered through a 9.0 cm Reeve Angel grade 230 paper filter (Whatman, Inc., 9 Bridewell Place, Clifton, N.J., 07014, 800-441-6555), and the turbidity of filtrate was measured using a Hach Model 2100A Turbidimeter (Hach Company, P.O. Box 389, Loveland, Colo., 80539, 800-277-4224). Measured turbidity values for various chemical-to-wax ratios from the testing of several products are shown in Table 1. Background corrections were made for turbidity contributions from the chemistry alone. Higher turbidity levels correspond to higher levels of dispersion. Table 1 also shows results for the combination dispersants. The data indicates that the combination of naphthalene sulfonate and an EO/PO copolymer provided better performance than the individual chemistries (in efficiency and effectiveness in dispersing the added wax), and that the introduction of 2,2,4-trimethyl-1, 3-pentanediol diisobutyrate to this combination produced the best performance of the chemistries tested.

TABLE 1

Results of Wax Dispersion Tests

| Chemistry | 0 g/g | 0.25 g/g | 0.50 g/g | 1.00 g/g | 2.00 g/g | 3.00 g/g | 4.00 g/g |
|---|---|---|---|---|---|---|---|
| 9–10 mole % EO Ethoxylated Nonyl Phenol[1] | 43.0 | 165 | 200 | 230 | | | 275 |
| Na Naphthalene Sulfonate[2], MW~12,000, 40% Solids[2] | 45.0 | 210 | 235 | 260 | 300 | | 350 |
| Ammonia Lignosulfonate, Polyethylene Glycol[3], 50% Solids | 45.0 | 175 | 160 | 160 | | 160 | |
| Na Dioctyl Sulfosuccinate[4], 52.5% Solids | 45.0 | 200 | 260 | 290 | | 300 | |
| 2,2,4-Trimethyl-1,3-Pentanediol Diisobutyrate[5] | 50.0 | 140 | 132 | 170 | 170 | | |
| 10 mole % BO EO/PO Copolymer[6], MW~3600 | 30.0 | 260 | 410 | 420 | 375 | | 390 |
| Conventional Dispersant 1[7] (49% Solids) | 60.0 | 190 | 180 | 200 | 230 | | 230 |
| Conventional Dispersant 2[8] (20% Solids) | 45.0 | 95.0 | 110 | 140 | | 175 | |
| Chemistry (Blends) | 0 g/g | 0.20 g/g | 0.75 g/g | 1.20 g/g | | | |
| Naphthalene Sulfonate[2] (40% solids) and EO/PO Copolymer[6] (equal mass blend) | 45.0 | 510 | 465 | 420 | | | |
| Naphthalene Sulfonate[2] (40% solids), EO/PO Copolymer[6], and 2,2,4-Trimethyl-1,3-Pentanediol Diisobutyrate[5] (equal mass blend) | 45.0 | 490 | 525 | 650 | | | |

[1]available from Nalco Chemical Co. of Naperville, IL
[2]available from Hampshire Chemical Corporation under the trade name DAXAD 16
[3]available from Nalco Chemical Co. of Naperville, IL
[4]available from Nalco Chemical Co. of Naperville, IL
[5]available from Nalco Chemical Co. of Naperville, IL
[6]available from Nalco Chemical Co. of Naperville, IL
[7]available from Nalco Chemical Co. of Naperville, IL
[8]available from Nalco Chemical Co. of Naperville, IL

Example 2

The following method was also utilized to determine effectiveness of the contaminant dispersant treatments. Two-hundred-fifty mL of hardened distilled water (275.4 ppm $CaCl_2.2H_2O$, 231 ppm $MgSO_4.7H_2O$, 231 ppm $NaHCO_3$)

and the contaminant dispersant were combined in a jacketed mixer (Eberbach Corporation) and allowed to equilibrate to a temperature of 125° F.(51.7° C.). A sample of corrugated container board coated with petroleum wax was then added and the mixer was run for 6 minutes. Coated board samples were produced by dipping ~1"×1" sections of board into a melted wax mixture (heated to 200° F. (93.3° C.)) containing 20% impregnating wax and 80% saturating wax from various sources (Amoco, Chevron (575 Market Street, San Francisco, Calif., 94105, 415-894-7700), Conoco (600 North Dairy Ashford, Houston, Tex., 77079, 281-293-1000) Exxon (5959 Las Colinas Blvd., Irving, Tex., 75039, 972-444-1000), Mobil (3225 Gallows Road, Fairfax, Va., 22037, 703-846-3000)) ranging in melting point from 127–150° F. (52.8° C. to 65.6° C.). The coating level for these sections was approximately 300–400 mg per 400 mg corrugated board. The fiber-wax slurry generated in the mixture was then filtered through a 9.0 cm Reeve Angel grade 230 paper filter (Whatman, Inc.), and a portion of the filtrate (100 mL) was combined with 100 mL of propanol and mixed for 10 minutes and passed through a preweighed 0.45 $\mu$m filter membrane (Gelman Sciences, 600 South Wagner Road, Ann Arbor, Mich., 48103-9019, 313-665-0651). The sample was then dried overnight and weighed. Fourier Transform Infared Spectroscopy analysis indicated that the collected sample was composed primarily of the wax introduced to the sample. Table 3 reports the percentage of wax added that is dispersed by the chemical as a function of the treatment concentration reported in g treatment per g wax. Results have an estimated uncertainty of ±7%. Dispersant A is a conventional wax treatment that has a solids level of approximately 20%. The active component is an alkoxylated alkanol amide. Dispersant B is a combination of an EO/PO block copolymer and naphthalene sulfonate (40% solids) with a solids level of 43%. Dispersant C is an equal mass combination of the EO/PO block copolymer, naphthalene sulfonate (40% solids) and 2,2,4-trimethyl-1,3-pentanediol diisobutyrate with a solids level of 43%. The level of wax dispersion is reported as wax dispersion (%) =

$$\frac{2.5 \times \text{mass of wax collected on 0.45 } \mu m \text{ filter membrane}}{\text{mass of wax added}} \times 100$$

The data indicates that Dispersant B greatly outperforms the conventional wax treatment Dispersant A. The performance of Dispersant B is then further increased (significantly) with the addition of 2,2,4-trimethyl-1,3-pentanediol diisobutyrate (Dispersant C).

TABLE 2

Wax dispersion test results.

| Conc. Dispersant A[1] (g/g) | wax dispersion (%) | Conc. Dispersant B[2] (g/g) | wax dispersion (%) | Conc. Dispersant C[3] (g/g) | wax dispersion (%) |
|---|---|---|---|---|---|
| 0 | 9.7 | 0 | 11 | 0 | 11 |
| 0.68 | 6.6 | 0.53 | 31 | 0.60 | 51 |
| 1.3 | 7.8 | 1.2 | 44 | 1.2 | 76 |
| 2.3 | 6.5 | 1.6 | 45 | 2.5 | 79 |
| 4.9 | 8.5 | 4.6 | 55 | 4.0 | 84 |
| 8.4 | 9.4 | 6.2 | 59 | 8.4 | 97 |
| 9.8 | 9.4 | 8.8 | 62 | 10 | 97 |

[1]available from Nalco Chemical Co. of Naperville, IL
[2]available from Nalco Chemical Co. of Naperville, IL
[3]available from Nalco Chemical Co. of Naperville, IL Example 3

The same procedure as described in Example 2 was used with the exception of the temperature. Table 3 shows results at 115° F. (46.1° C.), 135° F. (57.2° C.), and 145° F. (62.8° C.). The results indicate that increasing temperature increases the performance of the dispersants and that the addition of 2,2,4-trimethyl-1,3-pentanediol diisobutyrate to an already effective dispersant (Dispersant B) produces a formulation (Dispersant C) that provides greater dispersion of the wax both below and above its melting point.

TABLE 3

Wax dispersion test results at various temperatures.

| Conc. Dispersant A[1] (g/g) | wax dispersion (%) | Conc. Dispersant B[2] (g/g) | wax dispersion (%) | Conc. Dispersant C[3] (g/g) | wax dispersion (%) |
|---|---|---|---|---|---|
| 115° F. (46.1° C.) | | | | | |
| 0 | 1.1 | 0 | 3.0 | 0 | 2.9 |
| 0.68 | 1.3 | 0.64 | 8.8 | 0.80 | 25 |
| 1.4 | 1.5 | 1.4 | 11 | 1.4 | 28 |
| 2.6 | 0.3 | 2.5 | 13 | 2.6 | 37 |
| 5.9 | 1.8 | 6.8 | 17 | 6.3 | 40 |
| 8.1 | 2.1 | 10 | 22 | 8.4 | 40 |
| 11 | 1.9 | 12 | 19 | 12 | 45 |
| 135° F. (57.2° C.) | | | | | |
| 0 | 9 | 0 | 11 | 0 | 11 |
| 0.48 | 21 | 0.47 | 43 | 0.72 | 78 |
| 1.1 | 20 | 1.3 | 69 | 1.1 | 90 |
| 2.8 | 20 | 1.8 | 70 | 2.2 | 95 |
| 3.8 | 19 | 3.7 | 76 | 4.6 | 100 |
| 7.5 | 22 | 6.4 | 79 | 8.9 | 100 |
| 8.6 | 21 | 7.9 | 76 | 7.5 | 100 |
| 145° F. (62.8° C.) | | | | | |
| 0 | 17 | 0 | 18 | 0 | 17 |
| 0.62 | 28 | 0.49 | 67 | 0.78 | 87 |
| 1.1 | 27 | 1.2 | 70 | 1.3 | 100 |
| 3.0 | 33 | 2.5 | 92 | 2.8 | 100 |
| 4.6 | 35 | 4.6 | 95 | 5.7 | 100 |
| 7.4 | 36 | 8.4 | 100 | 8.0 | 100 |
| 12 | 39 | 12 | 93 | 11 | 100 |

[1]available from Nalco Chemical Co. of Naperville, IL
[2]available from Nalco Chemical Co. of Naperville, IL
[3]available from Nalco Chemical Co. of Naperville, IL Example 4

Another method to determine dispersion effectiveness is the coupon deposition test, described herein. A cleaned Teflon™ coupon was preweighed and fixed in the top of a jacketed mixer (Eberbach Corporation). Two-hundred-fifty milliliters of hardened distilled water (275.4 ppm $CaCl_2.2H_2O$, 231 ppm $MgSO_4.7H_2O$, 231 ppm $NaHCO_3$)

and the contaminant dispersant were then added and allowed to equilibrate to 125° F. (51.7° C.). A piece of bleached kraft paper coated with approximately 100 mg of wax was then added, and the mixer was run for 6 minutes. The coupon was then removed and rinsed with distilled water to remove any non-deposited wax, and hung up to dry. The dried weight of wax deposited on the Teflon™ coupon was reported as $$\% \text{ deposited} = \frac{\text{wt. wax deposited}}{\text{wt. wax added}} \times 100$$

Tables 4 and 5 report the results of wax deposition tests at various temperatures on three commercially available waxes used to coat corrugated containers. The Amoco Eskar R-35 and Chevron Saturating Wax 2 contain paraffin wax with little or no additives. The Conoco Supercote™ 4/5 is a curtain coating wax containing significant levels of a polymer additive. Table 4 lists results for testing when no dispersant was added and Table 5 presents values for when Dispersant C was added at levels of 1 g treatment per 1 g wax.

The tables also show the results of dispersion tests. In that procedure 250 mL of hardened distilled water (275.4 ppm $CaCl_2 \cdot 2H_2O$, 231 ppm $MgSO_4 \cdot 7H_2O$, 231 ppm $NaHCO_3$) and the contaminant dispersant were combined in a jacketed mixer (Eberbach Corporation) and allowed to equilibrate to a selected temperature. A 200 mg sample of wax was then added and the mixer was run for 6 minutes. The fiber-wax slurry generated in the mixture was then filtered through a 9.0 cm Reeve Angel grade 230 paper filter (Whatman, Inc.), and a portion of the filtrate was used to make a turbidity measurement. Another portion (100 mL) was combined with 100 mL of propanol and mixed for 10 minutes and passed through a preweighed 0.45 μm filter membrane (Gelman Sciences). The sample was then dried overnight and weighed. The level of wax dispersion is reported as wax dispersion (%) =
$$\frac{2.5 \times \text{mass of wax collected on 0.45 } \mu\text{m filter membrane}}{\text{mass of wax added}} \times 100$$

Again, Table 4 describes performance when no dispersant was present and Table 5 lists dispersion results with 200 mg of Dispersant C present. The results indicate that for the materials composed primarily of paraffin waxes at a given temperature, Dispersant C is able to significantly improve dispersion (breaking the material down and preventing deposition). For materials containing higher levels of additives, Dispersant C again enhances dispersion. However, its greater contribution for this material is to prevent deposition.

TABLE 4

Dispersion and deposition test results when no treatment chemical is present
(Not to be considered an Example of the instant claimed invention)

| | Chevron Saturating Wax #2 | | | Amoco R-35 Impregnating Wax | | | Conoco 752 Curtain Coating | | |
|---|---|---|---|---|---|---|---|---|---|
| Temp | % deposition | % dispersion | Turbidity | % deposition | % dispersion | Turbidity | % deposition | % dispersion | Turbidity |
| 80 | 9.3 | 1.0 | 1.0 | 28 | 1.1 | 1.5 | 9.0 | 2.5 | 0.75 |
| 90 | 14 | 1.4 | 1.0 | 35 | 1.6 | 1.0 | 8.9 | 1.6 | 1.0 |
| 100 | 12 | 2.0 | 1.0 | 41 | 4.6 | 1.0 | 13 | 2.2 | 1.0 |
| 110 | 14 | 2.4 | 1.8 | 42 | 6.1 | 2.6 | 17 | 2.1 | 1.8 |
| 120 | 12 | 2.4 | 8.0 | 50 | 0.37 | 44 | 12 | 1,0 | 1.4 |
| 130 | 28 | 24 | 140 | 11 | 8.6 | 63 | 14 | 1.4 | 4.4 |
| 140 | 6.4 | 51 | 250 | 2.2 | 56 | 350 | 15 | 4.2 | 25 |
| 150 | 3.5 | 73 | 320 | 0.46 | 57 | 200 | 7.7 | 21 | 82 |
| 160 | 3.6 | 69 | 300 | 1.4 | 75 | 200 | 5.7 | 19 | 64 |

TABLE 5

Dispersion and deposition test results in the presence of Dispersant C at a level
of 1 mg/mg wax

| | Chevron Saturating Wax #2 | | | Amoco R-35 Impregnating Wax | | | Conoco 752 Curtain Coating | | |
|---|---|---|---|---|---|---|---|---|---|
| Temp | % deposition | % dispersion | Turbidity | % deposition | % dispersion | Turbidity | % deposition | % dispersion | Turbidity |
| 80 | 3.4 | 2.1 | 9.7 | 3.3 | 1.4 | 8.5 | 2.2 | 1.0 | 10 |
| 90 | 2.6 | 1.4 | 10 | 8.1 | 1.1 | 12 | 2.5 | 1.5 | 10 |
| 100 | 5.4 | 2.2 | 9.8 | 17 | 2.1 | 9.5 | 2.2 | 3.4 | 9.5 |
| 110 | 6.5 | 4.0 | 10 | 21 | 10 | 14 | 4.5 | 2.9 | 8.0 |
| 120 | 6.5 | 22 | 58 | 30 | 46 | 340 | 8.2 | 2.2 | 10 |
| 130 | 10 | 74 | 1400 | 9.4 | 81 | 2000 | 7.7 | 10 | 46 |
| 140 | 1.0 | 83 | 2100 | 0.24 | 92 | 2400 | 5.5 | 26 | 340 |
| 150 | 0.69 | 97 | 1900 | 0.0 | — | 2200 | 0.72 | 55 | 625 |
| 160 | 0.0 | 95 | 2000 | 0.0 | 100 | 2000 | 0.65 | 53 | 550 |

Example 5

The stability of the wax treated with this treatment was tested in the following manner. Five-hundred mL of hard ened distilled water (275.4 ppm $CaCl_2 \cdot 2H_2O$, 231 ppm $MgSO_4 \cdot 7H_2O$, 231 ppm $NaHCO_3$) and contaminant dispersant (when treatment was tested) were combined in 2,250 mL, jacketed mixers (Eberbach Corporation) and allowed to equilibrate to a temperature of 145° F.(62.8° C.). A 150 mg sample of Chevron Saturating Wax 2 were then added to each mixer and the mixer was run for 6 minutes. The wax dispersions generated were then combined with 2500 mL of 100° F. (37.8° C.) hardened distilled water (275.4 ppm $CaCl_2 \cdot 2H_2O$, 231 ppm $MgSO_4 \cdot 7H_2O$, 231 ppm $NaHCO_3$) in a 3000 mL beaker and mixed for about 2 minutes. A 300 mL sample was drawn and analyzed by filtering it through a 9.0 cm Reeve Angel grade 230 paper filter (Whatman, Inc.), combining it with 200 mL of isopropanol, mixing the sample for 10 minutes, and passing it through a preweighed 0.45 μm filter membrane (Gelman Sciences). The sample was then dried overnight and weighed. A portion of the remaining, untested sample, was then transferred to a 2000 mL Erlenmeyer flask, placed in a 100° F. (37.8° C.) temperature bath, covered, and mixed at 500 rpm using a Britt Jar propeller (Paper Research Materials, 2828 Southwest 171$^{st}$ Street, Seattle, Wash. 98166-3268, (206) 248-2058). Samples were then drawn and analyzed on a periodic basis. Table 6 describes stability when no dispersant was present, and when Dispersant B and Dispersant C were present at levels of 2 g/g wax. The results indicate that the dispersion produced with Dispersant C is significantly more stable than those produced with Dispersant B and with no dispersant present.

TABLE 6

Dispersion stability at 100° F. (37.8° C.).

| Time (hrs.) | No Dispersant Dispersion (%) | Time (hrs.) | Dispersant B Dispersion (%) | Time (hrs.) | Dispersant C Dispersion (%) |
|---|---|---|---|---|---|
| 0 | 100 | 0 | 100 | 0 | 100 |
| 0.04 | 48 | 1 | 85 | 1 | 96 |
| 0.23 | 31 | 2 | 87 | 2 | 102 |
| 0.33 | 22 | 4 | 85 | 4 | 109 |
| 0.42 | 21 | 8 | 85 | 8 | 108 |
| 0.5 | 18 | 24 | 48 | 24 | 103 |
| 1 | 13 | — | — | — | — |
| 2.2 | 7.3 | — | — | — | — |

Example 6

The contaminant dispersants were also tested in the following manner. Two liters of hardened distilled water (275.4 ppm $CaCl_2 \cdot 2H_2O$, 231 ppm $MgSO_4 \cdot 7H_2O$, 231 ppm $NaHCO_3$) were preheated to 135° F. (57.2° C.) and added to a temperature controlled British disintegrator. A blend of one gram each of EO/PO copolymer, naphthalene sulfonate, and 2,2,4-trimethyl-1,3-pentanediol diisobutyrate were added (enough to disperse nearly 100% of the added wax) and mixed for 30 seconds. A single coated board sample and 24 g of sectioned corrugated board (approximately 1"×1") were then added and the British disintegrator was run for 25 minutes (approximately 77,500 revolutions). Coated board samples were produced by dipping approximately 1"×1" sections of board into a melted wax mixture (heated to 200° F.(93.3° C.)) containing 20% impregnating wax and 80% saturating wax from various sources (Amoco, Chevron, Conoco, Exxon, Mobil) ranging in melting point from 127–150° F.(52.8° C. to 65.6° C.). The coating level for these sections was approximately 300–400 mg per 400 mg corrugated board. The sample was maintained at 135° F.(57.2° C.) and 250 mL aliquots were transferred into 400 mL plastic tri-pour beakers for testing. Using a Britt Jar (Paper Research Materials) with a mixing speed of 500 rpm, the coagulant treatment was mixed into the stock sample using a syringe according to the following mixing sequence:

| Time (seconds) | Procedure |
|---|---|
| 0 | start mixer |
| 10 | add coagulant polymer |
| 30 | stop mixer |

Immediately following this sequence the sample was filtered through Reeve Angel 230 paper filter (Whatman, Inc.), and the turbidity of the filtrate was measured. Results are reported as a turbidity reduction calculated as $$\text{Turbidity Reduction} = \frac{(\text{Turbidity})_{Blank} - (\text{Turbidity})_{Sample}}{(\text{Turbidity})_{Blank}}.$$

The dose (g polymer actives per g wax) necessary to achieve turbidity reduction values of >0.80 for various coagulants is shown in Table 7. All treatments are conventional coagulant treatments for contaminants. This data indicates that once a material has been dispersed it can be removed (for example) through the addition of a coagulant.

TABLE 7

Wax Coagulant Test results.

| Chemistry | dose (g/g) necessary to achieve >0.8 turbidity reduction |
|---|---|
| Linear Epichlorohydrin-Dimethylamine Copolymer[1] | 0.137 |
| EDC/Ammonia Polymer[2] | 0.497 |
| Ammonia Crosslinked Epichlorohydrin-Dimethylamine Copolymer[3] | 0.310 |
| Polyacrylamide[4] | 1.33 |
| Poly Diallyl Dimethylammonium Chloride 1[5] | 0.193 |
| Poly Diallyl Dimethylammonium Chloride 2[6] | 0.161 |
| Poly Diallyl Dimethylammonium Chloride 3[7] | 0.236 |
| Poly Diallyl Dimethylammonium Chloride 4[8] | 0.187 |

[1]available from Nalco Chemical Co. of Naperville, IL
[2]available from Nalco Chemical Co. of Naperville, IL
[3]available from Nalco Chemical Co. of Naperville, IL
[4]available from Nalco Chemical Co. of Naperville, IL
[5]available from Nalco Chemical Co. of Naperville, IL
[6]available from Nalco Chemical Co. of Naperville, IL
[7]available from Nalco Chemical Co. of Naperville, IL
[8]available from Nalco Chemical Co. of Naperville, IL Example 7

A test of the efficacy of a contaminant dispersant is to apply the contaminant dispersant to a composition containing a contaminant and measuring the contaminant particle size distribution. An indication of an effective contaminant dispersant is if the particle size distribution is narrow with a particle diameter preferably less than 1.25 μm.

In FIG. 1, line 2 shows the particle size distribution of Amoco®R-35 impregnating wax dispersed with nothing.

In FIG. 1, line 1 shows the particle size distribution of wax dispersed with a contaminant dispersant of the preferred formula.

Figure 2A:
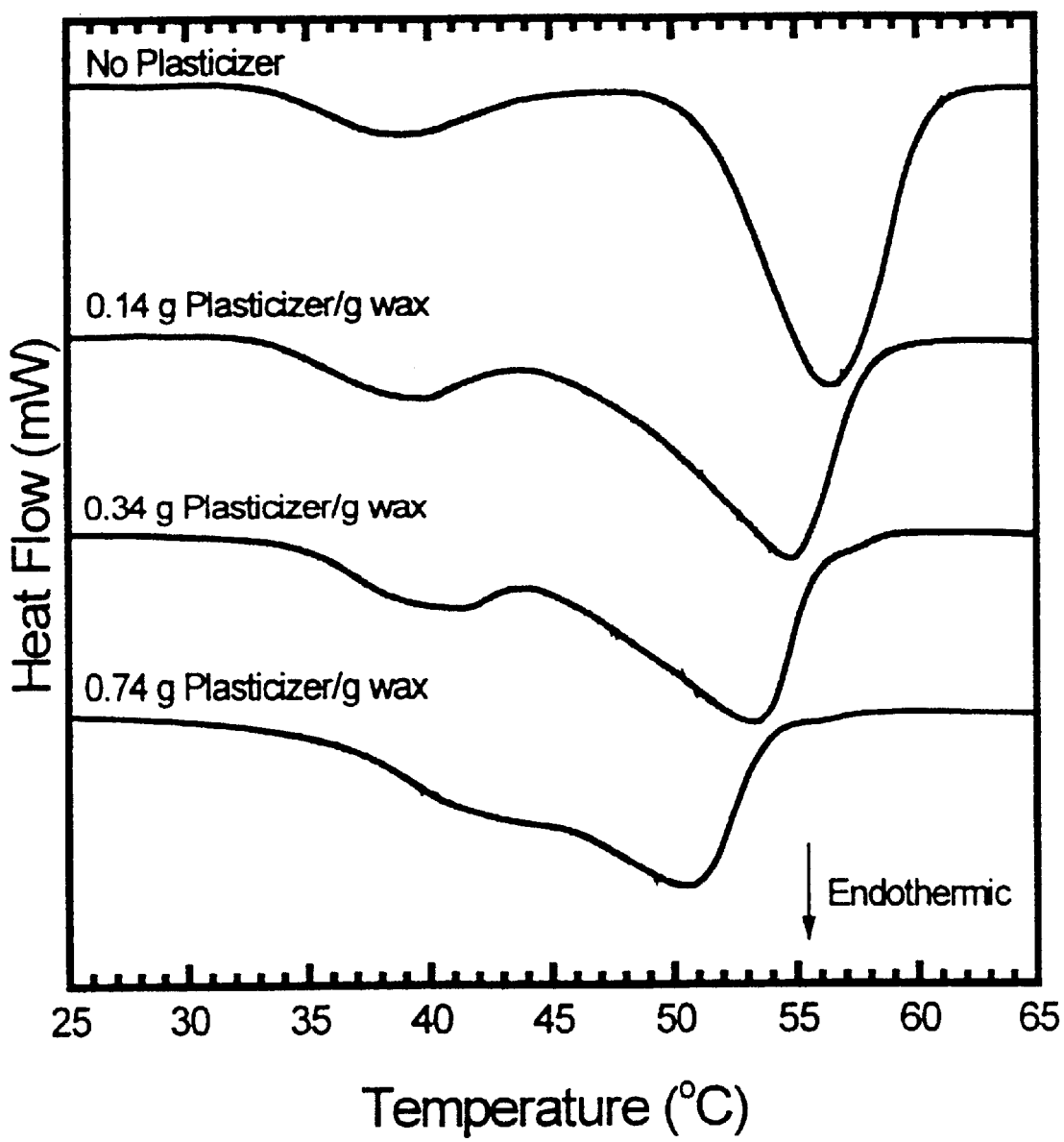
FIG. 2A is a Plot of Differential Scanning Calorimeter Data for Wax Containing Four Different Doses (one of the doses being zero) of Plasticizer which is 2,2,4-trimethyl-1,3 pentanediol diisobutyrate.

In FIG. 2A, a differential scanning calorimeter is used to illustrate the reduction in melting point for Amoco®R-35 impregnating wax that has had four different dosages of plasticizer added.

Figure 2B:
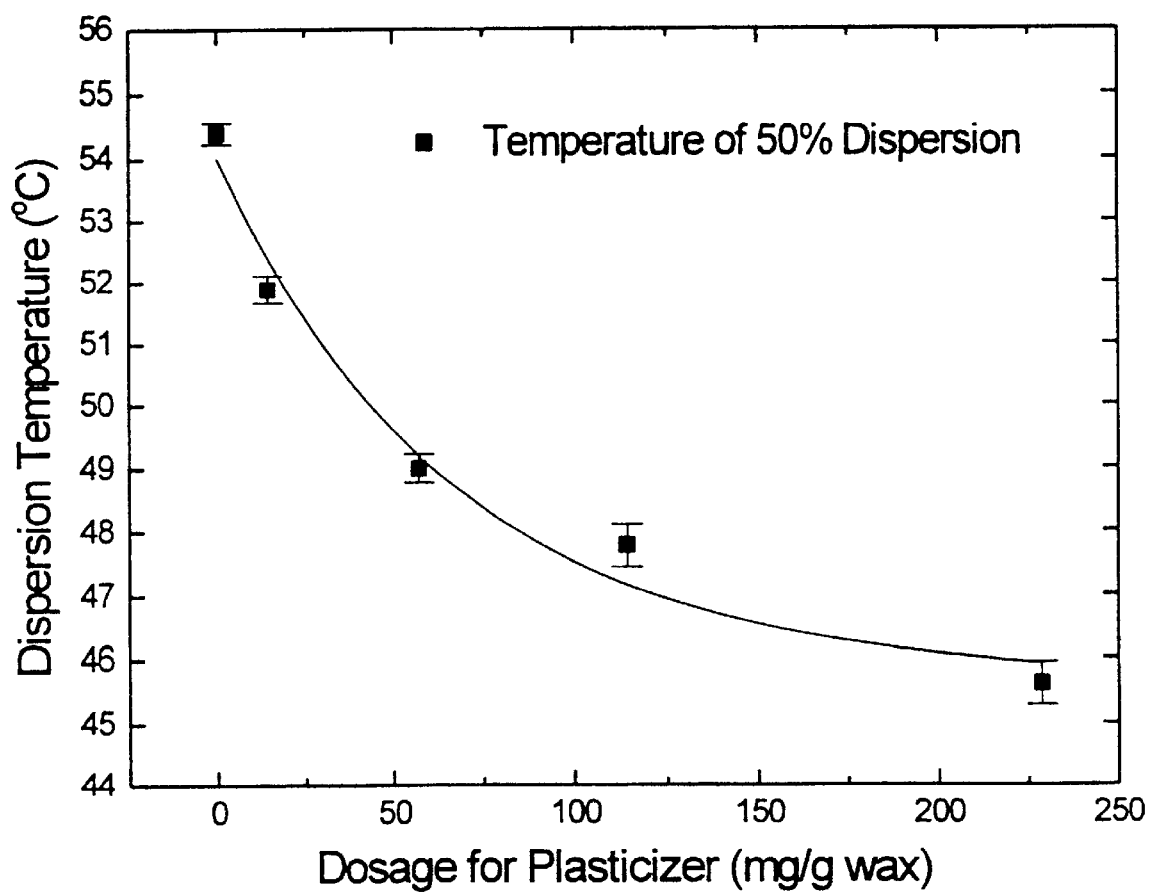
FIG. 2B is a Plot of Dispersion Temperature vs. Dosage of Plasticizer.

In FIG. 2B, a plot of dispersion temperature versus dosage of plasticizer is shown with the maximum decrease of the dispersion temperature of wax found to be about 8 degrees celsius. The indicated reduction in melting point shows the efficacy of plasticizer in melting/dispersing the wax.

What is claimed is:

1. A contaminant dispersant consisting of:

water, about 42.9 weight %;

plasticizer, which is 2,2,4-trimethyl-1,3-pentanediol diisobutyrate, about 14.3 weight %;

surfactant wetting agent, which is L101 ethylene oxide/propylene oxide block copolymer, 100% actives, about 14.3 weight %;

anionic dispersant, which is sodium salt of napthalene sulfonate, about 14.3 weight %;

acid, which is dodecyl benzenesulfonic acid, about 7.1 weight %; and base, which is triethanol amine, about 7.1 weight %.

2. A contaminant dispersant consisting of:

water, about 42.9 weight %;

plasticizer, which is 2,2,4-trimethyl-1,3-pentanediol diisobutyrate, about 14.3 weight %;

surfactant wetting agent, which is L101 ethylene oxide/propylene oxide block copolymer, 100% actives, about 14.3 weight %;

anionic dispersant, which is a sodium salt of napthalene sulfonate, about 14.3 weight %; and lecithin, about 14.2 weight %.

3. A contaminant dispersant consisting of:

water, about 42.9 weight %;

plasticizer, which is 2,2,4-trimethyl-1,3-pentanediol diisobutyrate, about 14.3 weight %;

surfactant wetting agent, which is L101 ethylene oxide/propylene oxide block copolymer, 100% actives, about 14.3 weight %;

anionic dispersant, which is a sodium salt of napthalene sulfonate, about 14.3 weight %; and a preneutralized component, wherein said preneutralized component is selected from the group consisting of sulfonates of dodecyl and tridecylbenzene, about 14.2 weight %.

* * * * *